US008145570B2

(12) United States Patent
Major et al.

(10) Patent No.: US 8,145,570 B2
(45) Date of Patent: Mar. 27, 2012

(54) METHOD AND MECHANISM FOR VENDING DIGITAL CONTENT

(75) Inventors: Robert Drew Major, Orem, UT (US);
Stephen R. Carter, Spanish Fork, UT (US); Hilarie Orman, Woodland Hills, UT (US)

(73) Assignee: Novell Intellectual Property Holdings, Inc., Seattle, WA (US)

( * ) Notice: Subject to any disclaimer, the term of this patent is extended or adjusted under 35 U.S.C. 154(b) by 98 days.

(21) Appl. No.: 11/852,502

(22) Filed: Sep. 10, 2007

(65) Prior Publication Data

US 2008/0046377 A1      Feb. 21, 2008

Related U.S. Application Data

(60) Division of application No. 11/266,924, filed on Nov. 4, 2005, now Pat. No. 7,386,514, which is a continuation of application No. 09/752,348, filed on Dec. 29, 2000, now Pat. No. 6,993,508.

(51) Int. Cl.
*G06F 21/00* (2006.01)
*G06F 15/16* (2006.01)

(52) U.S. Cl. ............. 705/51; 705/57; 709/219; 709/226

(58) Field of Classification Search ............ 705/50, 705/51, 57
See application file for complete search history.

(56) References Cited

U.S. PATENT DOCUMENTS

| | | | |
|---|---|---|---|
| 5,291,554 A | 3/1994 | Morales | |
| 5,553,143 A | 9/1996 | Ross et al. | |
| 5,798,785 A | 8/1998 | Hendricks et al. | |
| 5,857,020 A | 1/1999 | Peterson, Jr. | |
| 5,960,189 A * | 9/1999 | Stupek et al. | 717/169 |
| 5,974,548 A | 10/1999 | Adams | |
| 5,987,471 A | 11/1999 | Bodine et al. | |
| 6,011,537 A * | 1/2000 | Slotznick | 715/733 |
| 6,044,405 A * | 3/2000 | Driscoll et al. | 709/232 |

(Continued)

FOREIGN PATENT DOCUMENTS

EP        0975111       1/2000

(Continued)

OTHER PUBLICATIONS

"Fireclick Extinguishes Consumer Frustration caused by the A??World Wide WaitA", *Fireclick Accelerates Online Sales by Speeding Web Access for Consumers*, (Mar. 20, 2000), 1228.

(Continued)

*Primary Examiner* — Charles C Agwumezie
(74) *Attorney, Agent, or Firm* — Schwegman, Lundberg & Woessner, P.A.

(57) ABSTRACT

An Internet Box Office (IBO) system and technique vends digital content via a computer network, such as the Internet. The IBO system comprises a viewing system that cooperates with a Digital Rights Management system and various deployment enhancements within the Internet to provide an infrastructure that facilitates access to digital content in a manner that comports with copyright law and the control of intellectual property by the copyright owner. The IBO system enables a content copyright owner to retain control of its intellectual property while allowing a consumer to have transparent access to the copyright-protected content via the network. To that end, the IBO system operates to download and stage the copyrighted digital content on the viewing system of a consumer.

7 Claims, 3 Drawing Sheets

U.S. PATENT DOCUMENTS

| | | | |
|---|---|---|---|
| 6,049,892 A | 4/2000 | Casagrande et al. | |
| 6,057,872 A | 5/2000 | Candelore | |
| 6,061,726 A | 5/2000 | Cook et al. | |
| 6,105,069 A | 8/2000 | Franklin et al. | |
| 6,115,549 A | 9/2000 | Janis et al. | |
| 6,192,405 B1 | 2/2001 | Bunnell | |
| 6,351,815 B1 | 2/2002 | Adams | |
| 6,381,747 B1 | 4/2002 | Wonfor et al. | |
| 6,539,406 B1 | 3/2003 | Ibarra et al. | |
| 6,574,609 B1 | 6/2003 | Downs et al. | |
| 6,614,804 B1 * | 9/2003 | McFadden et al. | 370/468 |
| 6,654,933 B1 | 11/2003 | Abbott et al. | |
| 6,678,215 B1 | 1/2004 | Treyz et al. | |
| 6,742,033 B1 | 5/2004 | Smith et al. | |
| 6,799,221 B1 | 9/2004 | Kenner et al. | |
| 6,804,537 B1 | 10/2004 | Fujii | |
| 6,981,017 B1 | 12/2005 | Kasriel et al. | |
| 7,086,079 B1 | 8/2006 | Kunin et al. | |
| 7,209,892 B1 * | 4/2007 | Galuten et al. | 705/26.62 |
| 7,761,572 B1 * | 7/2010 | Auerbach | 709/226 |
| 2001/0002914 A1 | 6/2001 | Aramoto | |
| 2001/0003828 A1 * | 6/2001 | Peterson et al. | 709/219 |
| 2002/0046264 A1 * | 4/2002 | Dillon et al. | 709/219 |
| 2002/0078241 A1 * | 6/2002 | Vidal et al. | 709/247 |
| 2004/0205829 A1 * | 10/2004 | Hane, III. | 725/135 |
| 2006/0059098 A1 * | 3/2006 | Major et al. | 705/57 |
| 2006/0215029 A1 * | 9/2006 | Katz | 348/150 |

FOREIGN PATENT DOCUMENTS

| | | |
|---|---|---|
| JP | 2002/015193 | 1/2002 |

OTHER PUBLICATIONS

"The Value of Information: The Law and Digital Rights Management", http://www.trendsreport.net/information/7.html, Accessed online at http://web.archive.org/web/20000815232344/http://www.trendsreport.net/information/7.html, (2000), 1-3.

Gates, D., "A Real One-stop Media Shop", *Real Entertainment Center Industry Standard,* vol. 3 (20), ISSN: 1098-9196, (May, 2000), p. 77(1).

Gibbs, W. W., "Brace for Impact", *Scientific American,* 283(0), (Sep. 2000), 46.

* cited by examiner

METHOD AND MECHANISM FOR VENDING DIGITAL CONTENT

RELATED APPLICATION

This application is a Divisional of commonly assigned U.S. application Ser. No. 11/266,924, filed Nov. 4, 2005, now issued as U.S. Pat. No. 7,386,514. Moreover, Ser. No. 11/266,924 is a Continuation of U.S. application Ser. No. 09/752,348, filed Dec. 29, 2000 and which issued on Jan. 31, 2006 as U.S. Pat. No. 6,993,508. Each of the above-referenced applications and their disclosures are incorporated herein by reference.

FIELD OF THE INVENTION

The present invention relates to the delivery of multimedia content over computer networks and, in particular, to the delivery of premium entertainment content, such as digital movies, over computer networks, such as the Internet, without compromising the intellectual property rights of owners of that content.

BACKGROUND OF THE INVENTION

The Internet comprises a plurality of computers coupled to individually owned and operated networks and organizations, each of which cooperates with other networks to direct and exchange traffic among the computers. The computers typically communicate over the networks by exchanging discrete frames or packets of data according to predefined procedures and standards for protocols. The procedures and standards used for communication over the Internet are provided in, e.g., requests for comments that are agreed upon by Internet users and organizations. For example, the World Wide Web Consortium develops standards for the evolution of a fast growing part of the Internet, the World Wide Web (the "Web"). Common protocols used for exchanging data over the Internet include the File Transfer protocol (FTP), Transmission Control protocol/Internet protocol (TCP/IP), and the Hypertext Transfer protocol (HTTP).

The Internet generally operates according to a client/server model of information delivery that allows many client computers or consumers to access similar applications in files stored on a server computer. In this model, a consumer "connects" to a server on which information resides to thereby request the services of the server. These services may involve searching for information in a database and delivering the information in the form of a "web page". Using the TCP/IP protocol, the consumer may send HTTP requests to the server requesting a particular web page or the performance of a database query. In either instance, the request is broken into packets that are sent over the Internet's TCP/IP communication infrastructure to the server. In an embodiment wherein a plurality of servers cooperate to form a "web site", web server software executing on the servers enables the web site to locate the requested page or perform the requested search and return the results to the consumer.

To access a web site for purposes of requesting a service, a consumer of that service typically generates and issues packets to an online service or an Internet service provider (ISP). From the ISP, the packets travel through levels of communication links, computer platforms and carrier networks before they reach their final destination. These computer platforms may comprise intermediate stations, such as hubs, routers and switches, configured to process the packets and forward them over carrier networks to their proper destinations. Networks in a particular geographic area may be connected into a large regional network and regional networks may be further interconnected via high-speed backbone networks ("Internet backbones"). The intermediate stations direct data traffic over these carrier networks by processing the packets to determine where the data is headed. Based on the destination of the data, the packet is routed in a most efficient manner, generally to another intermediate station that, in turn, sends the packet to a next station.

The consumer typically issues the packets by either dialing into the online service or ISP over a telephone line or through an Internet service, such as "last mile broadband access". Last mile broadband access refers to technologies, such as cable modems, digital subscriber line and fixed wireless services, that provide consumers with high bandwidth access to the carrier networks of the Internet. For example, whereas conventional telephone lines may transmit data at e.g., 56 kilobits per second (Kbps), leased lines, such as T1 lines, may cooperate with last mile broadband access technologies to carry data at higher rates, such as 1.544 megabits per second (Mbps). Higher-speed links, such as T3 links, can transport data at rates up to 44.746 Mbps.

The convergence of last mile broadband access, digital storage media, and multimedia encoding and compression technologies has resulted in the ability to efficiently deliver digital content via the Internet. As used herein, digital content includes premium entertainment content such as digital audio and video data files. Despite the use of sophisticated encryption techniques and legal action, efforts to combat illegal copying of premium entertainment content over the Internet have proven ineffective. In fact, digital copying of copyrighted audio material from the Internet has become an increasingly worrying practice to the music industry.

For video, a similar situation may arise when multimedia compression and higher network bandwidths become widespread, and as digital storage prices continue to drop. An international standard for video compression that enables delivery of interactive multimedia content over the Internet is MPEG-4 or MP4. MP4 is a CODEC software algorithm that performs compression (and decompression) of multimedia data, such as digital video or movies, to as little as 10 percent of its original size with generally imperceptible losses in quality. For example MP4 may used to compress a feature length, 6 gigabyte (GB) digital movie to a single, 650 megabyte (MB) compact disc (CD) at VHS resolution with Dolby surround soundtrack.

As residential deployment of broadband access to the Internet increases, more consumers may want to access movies via the Internet for viewing in their homes. This new access pattern has the potential of increasing traffic on the Internet to very high and unacceptable levels. Once large content, i.e., greater than 10 MB, can be vended to consumers in a manner that makes them feel comfortable in its use, more large digital content will be authored and vended in a similar manner. Such a drastic change in the use of the Internet requires deployment of a new infrastructure needed to keep up with the demand. Because of the substantial change in their usage patterns, consumers can easily be charged for such usage and, therefore, the new infrastructure and industry to support the usage can be funded. The present invention is directed, in part, to an infrastructure that can accommodate the demand for vending large digital content to consumers over the Internet.

Currently, large content is downloaded in parcels and reassembled at the consumer sites. Because of the lack of a sufficient vending infrastructure, most of this digital content is "pirated". The entire process is essentially manual and fraught with trouble. The present invention is further directed to a technique that enables Internet access to digital movie content without compromising the intellectual property rights of owners of that content. In particular, the present invention is directed to a system that transparently facilitates access and payment for intellectual property, such as copyrighted digital content, and that complies with a model of registration, download and use.

SUMMARY OF THE INVENTION

The present invention comprises an Internet Box Office (IBO) system and technique for vending digital content via a computer network, such as the Internet. The IBO system comprises a viewing system that cooperates with a Digital Rights Management (DRM) system and various deployment enhancements within the Internet to provide an infrastructure that facilitates access to digital content in a manner that comports with copyright law and the control of intellectual property by the copyright owner. That is, the IBO system enables a content copyright owner to retain control of its intellectual property while allowing a consumer to have transparent access to the copyright-protected content via the network. To that end, the IBO system operates to download and stage the copyrighted digital content on the viewing system of a consumer.

In the illustrative embodiment, a content-delivery-networking (CDN) infrastructure leverages deployment enhancements, such as Content Exchange (CX) and Edge eX-change (EX) devices, to provide cost effective downloading of digital content, such as premium entertainment digital movies, over the Internet. The CX devices comprise caches, switches, routers and hubs, whereas the EX devices may comprise Internet Service Provider (ISP) switches and caching systems. A Movie Studio web server is configured to organize movie titles for browsing by consumers when selecting movies for viewing. The actual movie content is stored in encrypted form on a Movie Management system. The Movie Management system interacts with the CX and EX devices of the CDN infrastructure to deliver the encrypted digital content to the viewing system upon authorization by the DRM system.

The IBO system allows consumers to browse through entertainment content, select the content to be viewed, pay for the right to view the content and then view that content at their pleasure. Broadly stated, consumer interaction begins with the consumer accessing the Movie Studio web server to browse the selection of entertainment content (e.g., movies) available for viewing. Each selection made by the consumer may be "added to a cart" with a running total of payment due to view the content. When the consumer "goes to check out" to finalize the selection of a movie, a transparent dialog is conducted with a DRM system to register (i.e., authorize) the content for viewing.

In response to the consumer selecting the movie for viewing, the DRM system is again transparently accessed to obtain payment for viewing the content. At this point discounts may be provided if the consumer has agreed to view other content that warrants a discount, e.g., movie trailers for soon to be released movies. Registration and/or payment of the movie initiate a download operation of that digital content from the Movie Management system over the infrastructure of the Internet. The DRM then provides the viewing system with a decryption key that enables decryption of the encrypted content "on the fly" so that no decrypted version of the digital content exists at any time on the viewing system.

Advantageously, the inventive IBO system provides an infrastructure that can accommodate the demand for vending large digital content to consumers over the Internet. In addition, the IBO system enables Internet access to digital movie content without compromising the intellectual property rights of owners of that content. To that end, the IBO system transparently facilitates access and payment for intellectual property, such as copyrighted digital movies, and that complies with a model of registration, download and use of those movies.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1:
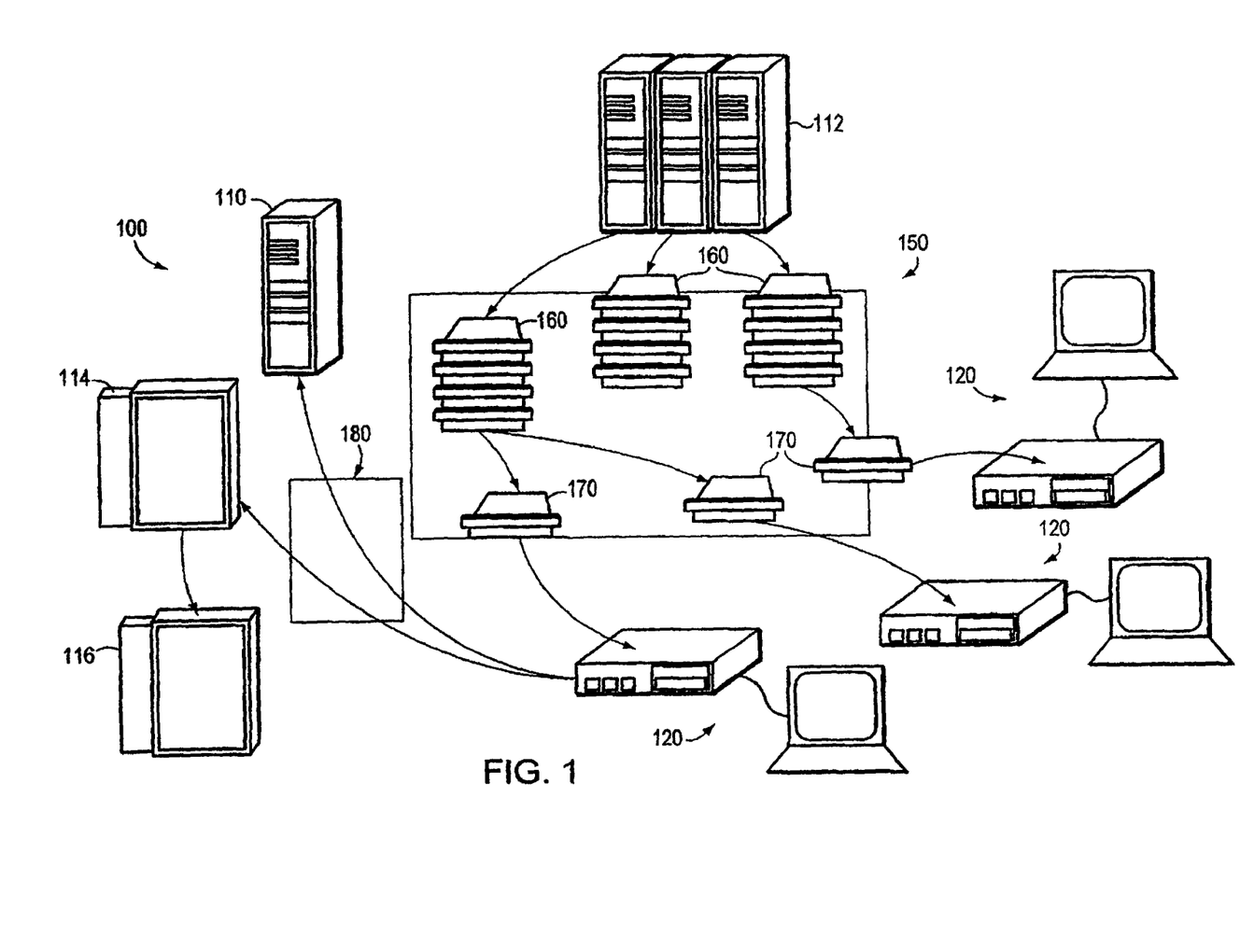
FIG. 1 is a schematic block diagram of an Internet Box Office (IBO) system in accordance with the present invention.

FIG. 1 is a schematic block diagram of an Internet Box Office (IBO) system 100 in accordance with the present invention. The IBO system 100 includes one or more viewing systems 120 that allow consumers to access servers over computer networks, such as the Internet. The servers preferably include one or more Movie Studio web servers 110, Movie Management systems 112, Billing systems 116 and Digital Rights Management (DRM) systems 114. The viewing systems 120 cooperate with the DRM systems 114 and various deployment enhancements within the Internet to provide an infrastructure 150 that facilitates access to premium entertainment content, e.g., digital movies, stored on the Movie Management systems 112. The Movie Studio web servers 110 are configured to organize movie titles for browsing by the consumers when selecting movies for viewing. Authorized versions of copyright-protected movie content are stored in encrypted form on the Movie Management systems. Although the Movie Management System 112 and Movie Studio Web Server 110 are shown as separate platforms, they can be combined into a single system. Similarly, the DRM 114 and Billing server 116 may be combined even though they are shown as separate systems.

As described herein, access to the digital movies occurs in a manner that conforms to copyright law and the control of intellectual property by the copyright owner. That is, the IBO system 100 enables a content copyright owner to retain control of its intellectual property while allowing a consumer to have transparent access to the copyright-protected content via the network. To that end, the IBO system operates to download and stage the digital content on the viewing systems 120. The viewing systems may comprise personal computers, home entertainment centers, television set-top boxes and associated play stations or other similar types of electronic equipment capable of displaying interactive multimedia entertainment content to consumers.

In the illustrative embodiment, a content-delivery-networking (CDN) infrastructure 150 leverages deployment enhancements, such as Content Exchange (CX) devices 160 and Edge exchange (X) devices 170, to provide cost effective downloading of digital movies over the Internet. The CX devices 160 comprise a collection of caches, switches, routers and hubs organized as a product offering from Novell, Inc. The CX product is a fully managed, web-content acceleration service based on Novell Internet Caching System technology that is powered by arrays of specialized caching devices located on site at web-hosting data centers. The CX product accelerates the flow of data from an origin web server to an Internet backbone, i.e., the "first foot" of the Internet.

The CX devices 160 are preferably deployed "in front of" servers (such as the Movie Management system 112) and intercept requests for web pages and other materials, such as digital files, from the consumers. The CX devices retrieve the requested files from the servers, copy those files into their caches and forward them to the requesting consumers. Subsequent requests for those materials are thereafter served from the caches of the CX devices rather than from the servers. The CX product thus "off loads" the processing load associated with retrieving and caching files from the servers, allowing them to respond more rapidly to requests for dynamic content.

Speeding traffic along the first foot between a server and the Internet backbone, i.e., local acceleration, is intended to relieve a bottleneck created by overloaded servers. Global acceleration alleviates problems associated with the Internet's infrastructure by establishing a network of caches that is physically closer to the requesting consumer. This cache network comprises a plurality of EX devices 170 organized as Internet Service Provider (ISP) systems having caches that cooperate with the CX devices deployed within the Internet. Decreasing the distance from the caches to the consumer significantly reduces delivery latency and the server's dependence on potentially unreliably connections.

Using its preferred web browser, a consumer browses for movies at its viewing station among the Movie Studio web sites 110. The movies are preferably organized on the web sites according to, e.g., actor, producer, subject and/or genre. Each web site further references movies available on the Movie Management systems 112. The Movie Management systems interact with the CX and EX devices of the CDN infrastructure 150 to deliver the encrypted digital content to the viewing system upon authorization by the DRM system 114. That is, each movie or trailer is managed by a conventional DRM system that coordinates receipt of payment and distribution of encryption keys.

The DRM system 114 generally provides tools for protecting digital content, such as MP4 movies, available over the Internet. These tools include access services that control a consumer's "right of entry" to obtain information (e.g., passwords, decryption keys and/or authentication). In addition, the DRM provides usage tools that control interfaces between the consumer and information (e.g., read-only rights), along with tracking tools that allow an information provider to track subsequent use and/or distribution of its information on line (e.g., watermarking and digital footprints). Moreover, the DRM provides payment tools that enable the information provider to generate revenue for the information accessed by the consumer. In an embodiment of the present invention, communication between a consumer and the DRM system may take place through a separate network cloud 180, thereby denoting secure and managed communication through the Internet in a way that protects the rights of the digital content copyright owner.

Though the movies and trailers may be stored locally on the consumer's viewing system, the copyright owner has not lost control of the content because each movie and trailer is stored in a form that the copyright owner dictates. Some content, such as trailers, may be stored in unencrypted form to allow the consumer to view that content without online access to the DRM. According to an aspect of the invention, the IBO system may provide a screen saver function that plays trailers during screen saver time and provides the consumer with a "one-click" mechanism to begin downloading a movie associated with a trailer. Other content, e.g., newly released movies, may be encrypted and available for viewing only after the consumer has paid for the right to view the content. Decryption of the encrypted content is performed "on-the-fly" so that no decrypted version of the content ever exists at the viewing system.

In another aspect of the present invention, the Movie Management system 112 cooperates with the viewing system 120 to optimally schedule downloading of desired content. For example, if a consumer requests a movie that takes three hours to download and the request occurs after midnight, the IBO system may delay a response to the request to create a download "convoy" wherein the same digital content stream may service multiple consumers. The convoy may be managed by reducing the speed of the download to comport with the slowest member of the convoy, if not substantially different. Typically, most consumers have similar Internet access speeds and, accordingly, this aspect of the invention should not substantially impact the consumer. In a mixed Internet access environment (e.g., 128K with 256K lines), however, multiple convoys may be needed. The intent of this inventive feature is to take advantage of the background nature of downloads to schedule these functions in a manner that provides cost effective use of bandwidth to keep download costs minimal.

Figure 2:
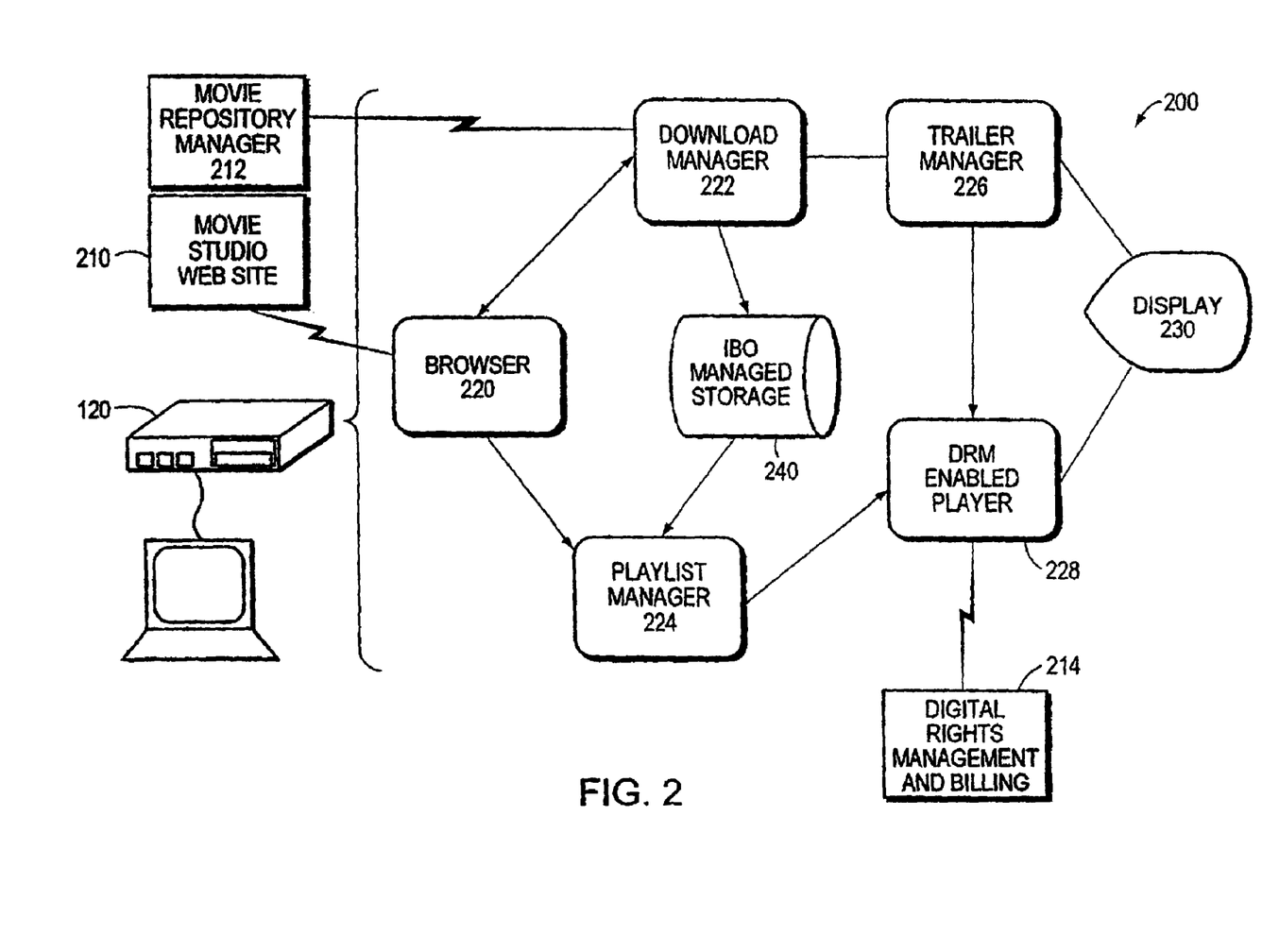
FIG. 2 is a functional block diagram illustrating processes associated with various components of the IBO system.

FIG. 2 is a functional block diagram illustrating processes 200 associated with various components of the IBO system. A web browser 220 is the central user interface (U/I) of the viewing system 120, thereby significantly reducing any U/I specific issues related to a platform. The browser interacts with Movie Studio web site processes 210 over the Internet to find and select content, such as movies and trailers, for viewing. The browser 220 also interacts with a Download Manager 222 of the viewing system via a conventional plug-in or JavaScript program to indicate the content to be downloaded. Further interaction may be necessary if older content must be removed from IBO Managed Storage 240 to make room for the new content. The browser further interacts with the Download Manager 222 and a Play List Manager 224 (via a plug-in or JavaScript program) to request a web page detailing the states of the movie downloads or movie/trailers that are available to be played.

The Download Manager 222 interacts with a Movies Repository Manager process 212 of the Movie Management system 112 to download digital content to the IBO Managed Storage 240 of the viewing system 120. The consumer is notified via the browser 220 when the content is available for viewing. Further, if the download operation is interrupted (e.g., a lost connection to the Internet or unavailability of the Movie Management system) the Download Manager resumes the operation as soon as conditions permit and notifies the consumer of the new availability time. Multiple downloads can be queued at any given time. The IBO system 100 balances the download operations with on-line access to prevent content download from impacting other Internet access.

The Download Manager 222 also receives notification to download content when a consumer indicates interest as a result of, e.g., seeing a trailer. The trailer can be viewed as a result of (i) starting a movie, (ii) playing a trailer directly, or (iii) being played by a trailer screen saver of the viewing system. The Download Manager requires some configuration (via the browser) to indicate how many trailers the consumer is willing to download per movie. The consumer may be enticed to download trailers by offering a discount on the price of viewing a movie if specific trailers are viewed. For example, a discount may be offered for a predetermined number of trailers watched in their entirety, no skipping for fast forwarding.

The Play List Manager 224 interacts with the browser 220 to allow the consumer to select content to be viewed. Thereafter, the Play List Manager interacts with a DRM Enabled Player process 228 to start the selected content. The DRM Enabled Player manages interaction with the DRM system 214 to charge for viewing the content and exchanging the decryption key for encrypted content. The DRM Enabled Player 228 receives the decryption key from the DRM 214 in a secure manner that employs, e.g., mutual authentication and the exchange of secrets. The DRM Enabled Player manages the encrypted content so that the movie is decrypted "on-the-fly" (as it is being viewed) thus preventing a clear or "plaintext" copy of protected content from ever being stored on permanent or persistent storage media (such as IBO Managed Storage 240) on the consumer's viewing system. The encryption/decryption process and the authentication/secret exchange processes preferably comprise conventional methods, such as secret or public key encryption.

Issuance of decryption keys to the DRM Enabled Player 228 preferably occurs on a time basis, e.g., the keys expire after a couple of days. It should be noted that the DRM Enabled Player 228 has the responsibility for protecting the keys during the applicable time period and, further, for ensuring the keys expire at the end of that period. Essentially, a consumer leases a decrypted version of the content for a period of time that allows some degree of rewind/playback. The DRM Enabled Player implements a policy management process that monitors, among other things, the duration of the lease, when trailers were actually viewed by the consumer and the degree of rewind/playback so that the intellectual property is not compromised. The policies governed by the policy management process may allow playback within, e.g., 10 minutes of the current position of the content. This prevents a consumer from viewing the entire content and then rewinding to view the content again, without having to pay for it. The DRM Enabled Player also interacts with the Download Manager 222 to erase the downloaded encrypted content upon expiration of the predetermined lease period.

The DRM Enabled Player further interacts with a Trailer Manager process 226 to play trailers. In this case, it is not anticipated that any interaction with the DRM system 214 is needed. The Trailer Manager plays trailers and watches for a "thumbs up" indication from the consumer indicating that the associated movie should be downloaded. This may be accomplished via an interaction icon superimposed on the trailer as it plays. In response to the "thumbs up" indication, the Trailer Manager 226 interacts with the Download Manager 222 to schedule the content for download. At this time, a one-time payment for viewing the content may be rendered, if allowed.

Figure 3:
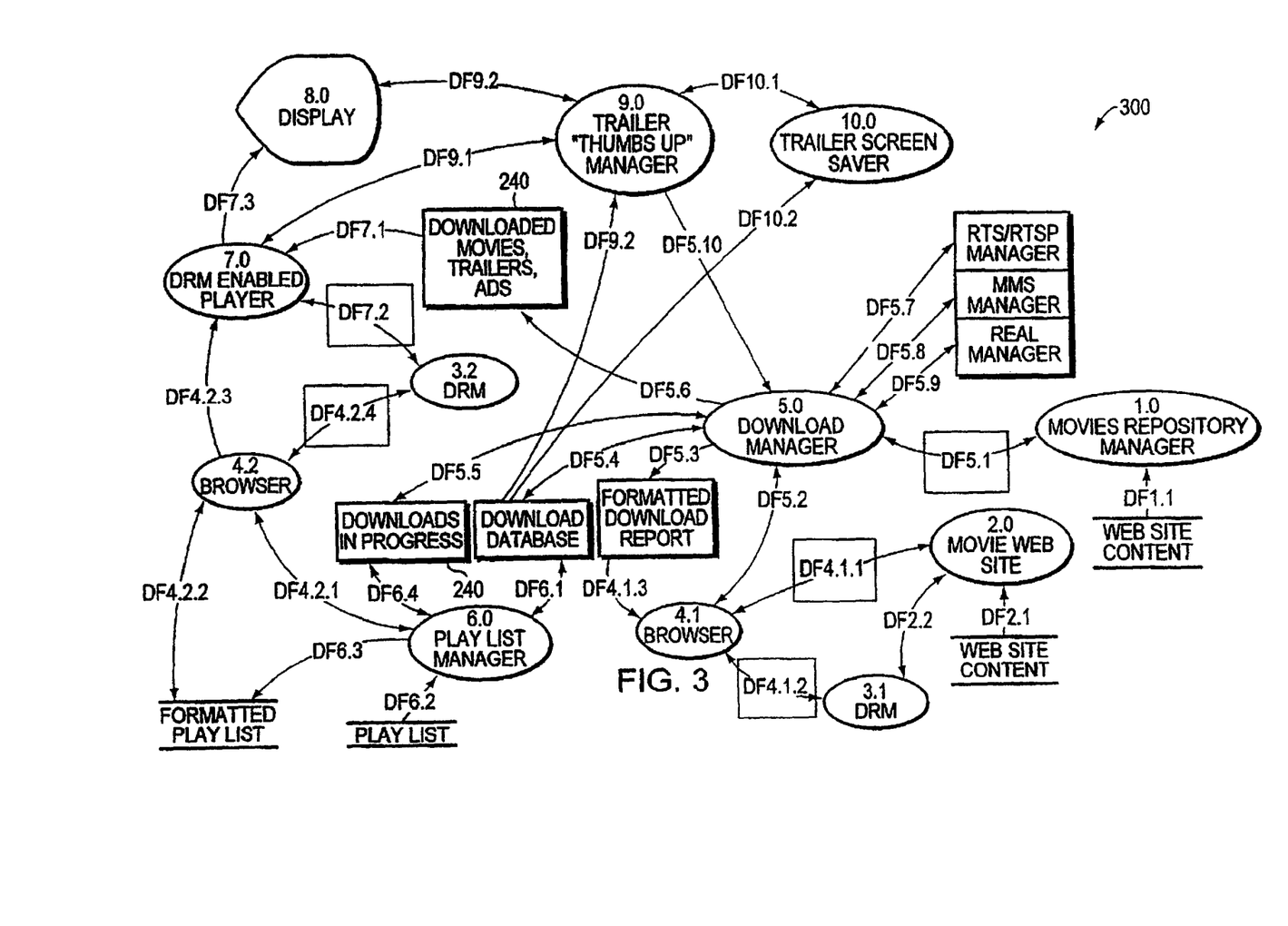
FIG. 3 is a functional data flow diagram illustrating the operation of the IBO system in accordance with the present invention.

FIG. 3 is a functional data flow diagram 300 illustrating the operation of the IBO system in accordance with the present invention. The IBO system 100 allows consumers to browse through entertainment content, select the content to be viewed, pay for the right to view the content and then view that content at their pleasure. As noted, the U/I for the viewing system 120 may comprise any popular web browser, e.g., Netscape or Internet Explorer. Any request to the IBO system results in the creation of a web page local to the viewing system that is rendered and interacted with via the browser. For example, a request from the Browser 4.1 to view the current download status of movies request by the consumer results in a request to the Download Manager 5.0 via data flow DF5.2. This request results in the creation of a web page detailing the information as a Formatted Download Report via DF5.3. The response from the Download Manager 5.0 to the Browser 4.1 results in a redirection to the Formatted Download Report via data flow DF 4.1.3. The consumer may view the downloaded status report in the Browser 4.1.

Broadly stated, consumer interaction begins with the consumer accessing the Movie Studio web server to browse the selection of entertainment content (e.g., movies) available for viewing. Each selection made by the consumer may be "added to a cart" (via the "add to cart" metaphor that is prevalent in today's e-commerce marketplace) with a running total of payment due to view the content. When the consumer "goes to check out" to finalize the selection of a movie, a transparent dialog is conducted with a DRM system to register (i.e., authorize) the content for viewing.

In response to the consumer selecting the movie, the DRM system is again transparently accessed to obtain payment for viewing the content. At this point discounts may be provided if the consumer has agreed to view other content that warrants a discount, e.g., movie trailers for soon to be released movies. Registration of and/or payment for the movie initiate a download operation of that digital content from the Movie Management system over the CDN infrastructure of the Internet. The DRM then provides the viewing system with a decryption key that enables decryption of the encrypted content "on the fly" so that no decrypted version of the digital content exists at any time on the viewing system.

The following description pertains to the operations and functions of various processes within the IBO system.

Movies Repository Manager 1.0. This process manages access to the movie files via DF1.1 and DF5.1. Although the Movies Repository Manager may comprise a FTP site, in the illustrative embodiment, it preferably comprises a repository that allows download operations only after certain conditions have been satisfied. The process 1.0 also receives an indication of the time and date that the consumer wishes to view the content. As noted, the Movies Repository Manager communicates with Download Manager 5.0 to coordinate activities needed to leverage the background nature of download operations to schedule the downloads in a manner that provides cost effective use of bandwidth to keep download costs minimal. For example, if a consumer has requested a movie that requires three hours to download and it is after midnight, it is acceptable to:

delay a response to the request to create a download "convoy" wherein the same digital content stream may service multiple consumers; and manage the convoy by reducing the speed of the download operation to comply with the slowest member of the convoy, if not substantially different. Typically, most consumers have similar Internet access speeds and, accordingly, this aspect of the invention should not substantially impact the consumer. In a mixed Internet access environment (128K with 256K lines), however, multiple convoys may be needed.

Movie Web Site 2.0. This process is a web site that facilitates searching and browsing of movie titles that are available for viewing. The Movie Web Site also has some interaction with DRM 3.1 via DF2.2 to register a download operation and/or get payment for downloading content. This is especially true if the content does not have a "pay-per-view" requirement but can be purchased outright. Registration with DRM 3.1 is provided to DRM 3.2 to verify that content was downloaded and played to compensate an infrastructure vendor (e.g. Novell, Inc.) for delivering the content. The interaction between DRM 3.2 and DRM 3.1 also requires interaction with Browser 4.1 via DF4.1.2.

Digital Rights Management (DRM) 3.0. This process is a third party process, such as InterTrust. In the illustrative embodiment, the IBO system is preferably configured to support many DRMs. Process 3.0 is not shown specifically in the data flow diagram; rather, two uses of DRM are shown as processes 3.1 and 3.2. This is done to show that these processes are not separate from a general instantiation of DRM 3.0, but are just separate uses of a DRM.

DRM 3.1. This process represents a use of the DRM to register downloading of a movie and/or acquire payment for the download operation via DF2.2 and DF4.1.2. DRM 3.1 also determines the number of downloaded trailers acceptable to the consumer, taking into account preferences (e.g., movie ratings) of the consumer via DF4.1.2.

DRM 3.2. This process represents a use of the DRM to deliver a decryption key in response to acquiring payment for showing of the movie on the consumer's viewing system via DF7.2 and DF4.2.4. A discount could be given at this point if the consumer accepts certain conditions, such as watching trailers before the movie showing or using the Trailer Screen Saver. These conditions are represented via DF9.1 in cooperation with the Trailer Manager 9.0.

Browser 4.0. This process is not specifically shown in the data flow diagram; rather two uses of the browser are shown as processes 4.1 and 4.2. This is done to show that these processes are not separate from a general instantiation of Browser 4.0, but are just separate uses of the browser.

Browser 4.1. This process represents a use of the browser to access a Movie Web Site via DF4.1.1, select movies to be downloaded (via an e-commerce mechanism such as "add to shopping cart"), and initiate a download operation. The actual download operation is performed by Download Manager 5.0. Download Manager 5.0 is advised of the requested downloads by either a browser plug-in and/or a JavaScript program that communicates with process 5.0 as illustrated by DF5.2. Interaction with Download Manager 5.0 is completely transparent to the consumer. Browser 4.1 may also need to interact with DRM 3.1 via DF4.1.2 to register the download and provide payment due at this time.

Browser 4.2. This process represents a use of the browser to access a Play List via DF4.2.2. The Formatted Play List identifies movies and trailers that are available for viewing. The list is created by Play List Manager 6.0 using DF6.1 and DF6.4. The Browser 4.2 requests access to the Play List via DF4.2.1, which results in a redirection to a web page, e.g., a hypertext markup language (HTML) web page, available via DF4.2.2. Selection of a movie or trailer results in a request to DRM Enabled Player 7.0 via DF4.2.3.

Download Manager 5.0. This process performs downloading of movies, trailers, and advertisements to the IBO Managed Storage (e.g., a disk or similar storage media) of the consumer via DF5.1 and DF5.6. The Download Manager also keeps track of down-loaded content via DF5.4 and content yet to be downloaded via DF5.5. A request from Browser 4.1 to view the status of downloading content is made via DF5.2. The process 5.0 generates an HTML page (i.e., the Formatted Download Report) describing the download status via DF5.3 and redirects Browser 4.1 via DF5.2 to retrieve the report via DF4.1.3. The process 5.0 can also receive a request to download content via DF5.10 as a result of a "thumbs up" from the consumer while viewing a trailer or advertisement.

The Download Manager uses DF5.7, DF5.8 and DF5.9 as needed for streaming media. The MP4 digital movies described herein are typically not implementations of streaming video technology. However, in an alternate embodiment of the invention, streaming video is supported by the IBO system. Streaming technology requires constant use of network bandwidth all the time. That is, when viewing digital content that is streamed to the viewing system, the network connection must be alive and functional. If bandwidth congestion occurs, then the stream quality suffers. In contrast, the IBO system functions to download the entire encrypted content of a movie to a storage medium (i.e., IBO Managed Storage) of the viewing system. At that point, network bandwidth is no longer needed. In accordance with another aspect of the invention, the Download Manager 5.0 interacts with the DRM Enabled Player 7.0 to erase the downloaded encrypted content after the predetermined time period.

Play List Manager 6.0. This process receives a request from Browser 4.2 to view a list of "ready for viewing" content via DF4.2.1. The Play List Manager receives downloads via DF6.1 and DF6.4 to create the Play List (as illustrated by DF6.2) and to create the Formatted Play List report via DF6.3. Browser 4.2 is instructed (via DF4.2.1) to retrieve the Formatted Play List via DF4.2.2. The Browser 4.2 can select content to play from this list and indicate the selection via DF4.2.3. Interaction with DRM 3.2 for payment verification is via DF4.2.4.

DRAM Enabled Player 7.0. This process comprises a media player that interacts with DRM 3.2 to allow payment for viewing the content and to receive the key necessary to decrypt the content for viewing. A significant feature of this process is the ability to decrypt content "on-the-fly" without storing the decrypted content on disk. The DRM Enabled Player also receives a request to play content via DF9.1 from Trailer Manager 9.0. The decrypted content is shown to the consumer on a viewing device, such as Display 8.0, via DF7.3 and is retrieved from the IBO Managed Storage via DF7.1.

Trailer Manager 9.0. This process manages trailer play scheduling via DF9.1 and monitors a "thumbs up" indicator via DF9.2 that starts a content download operation via DF5.10. Trailers are selected for play from a download database of the IBO Managed Storage via DF9.2.

Trailer Screen Saver 10.0. This process assumes duties of any standard screen saver. During screen saving, a trailer is displayed in response to an indication sent to Trailer Manager 9.0 via DF10.1. The displayed trailer is selected by the Trailer Screen Saver via DF10.2 primarily to keep the selection logic separate from trailer management logic.

Advantageously, the inventive IBO system provides an infrastructure that can accommodate the demand for vending large digital content to consumers over the Internet. In addition, the IBO system enables Internet access to digital movie content without compromising the intellectual property rights of owners of that content. To that end, the IBO system transparently facilitates access and payment for intellectual property, such as copyrighted digital movies, and that complies with a model of registration, download and use of those movies.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method, comprising:
   evaluating schedules for content delivery to clients;
   identifying one or more staging areas for the content in response to proximities of the one or more staging areas to the clients, the staging areas are a collection of network caches in closer physical proximity to the clients than servers originally having the content for distribution, the collection of network caches residing on devices located on site at web-hosting data centers having the content, the staging areas also each include switches, routers, and hubs for delivering the content to the clients; and acquiring the content in the one or more staging areas from the servers for subsequent delivery to the clients in response to the schedules, the schedules account for a time to download the content to the clients and bandwidth used to download the content to the clients from the one or more staging areas, and wherein the schedules dictate the same content is downloaded as a convoy stream to all of the clients, and a speed with which the download is achieved in the convoy stream is reduced to account for a particular speed of a slowest member of the convoy stream.

2. The method of claim 1 further comprising:

intercepting a request from a different client for the content, wherein the request is directed to a media server;

identifying the content in a select one of the staging areas that is in close proximity to the different client; and streaming the content from the select one of the staging areas to the different client.

3. A method, comprising:

downloading content to a staging area in response to the proximity of the staging area to a requesting client, the client is requesting the content and the staging area is a collection of network caches that are in closer physical proximity to the client than one or more servers originally having the content for distribution, the collection of network caches residing on devices located on site at web-hosting data centers having the content, the staging area also includes switches, routers, and hubs for delivering the content to the requesting client; and delaying delivery of the content from the staging area to the client in response to a schedule that determines when the client is to receive the content, and wherein the schedule accounts for bandwidth used when the content is to be delivered from the staging area to the client, and wherein the download is sent to multiple other clients, and wherein the same download is sent as a convoy stream to the client and the multiple other clients and a speed with which the convoy stream proceeds is set to a slowest client member's bandwidth.

4. The method of claim 3 further comprising, streaming the content from the staging area to the client when the schedule dictates delivery to the client.

5. The method of claim 3, wherein delaying further includes delaying in response to a time-to-download condition.

6. The method of claim 3, wherein delaying further includes delaying in response to a time of day when the client makes a request for the content.

7. The method of claim 3, wherein delaying further includes delaying in response to a time and date a consumer associated with the client wishes to view the content on the client.

* * * * *